July 23, 1957   J. F. CHURCH   2,800,411
CRYSTAL PURIFICATION APPARATUS AND PROCESS
Filed March 31, 1954   2 Sheets-Sheet 1

INVENTOR.
J. F. CHURCH
BY Hudson & Young
ATTORNEYS

July 23, 1957  J. F. CHURCH  2,800,411
CRYSTAL PURIFICATION APPARATUS AND PROCESS
Filed March 31, 1954  2 Sheets-Sheet 2

INVENTOR.
J. F. CHURCH
BY Hudson & Young
ATTORNEYS

United States Patent Office 2,800,411
Patented July 23, 1957

2,800,411

CRYSTAL PURIFICATION APPARATUS AND PROCESS

J. Frank Church, Bartlesville, Okla., assignor to Phillips Petroleum Company, a corporation of Delaware Application March 31, 1954, Serial No. 420,020

18 Claims. (Cl. 99—205)

This invention relates to an improved apparatus and process for crystal separation and purification. A specific aspect of the invention is concerned with the concentration of dilute solutions.

There has recently been devised a continuous method of separating and purifying liquid multi-component mixtures which is effective in producing a substantially pure component from such a system or mixture. Processes and apparatus of the nature with which this invention is concerned are fully disclosed in the copending applications of John A. Weedman, Serial No. 166,992, filed June 9, 1950, and of D. L. McKay, Serial No. 375,850, filed August 24, 1953. The general process involves cooling a liquid multi-component mixture from which the separation is to be made so as to form crystals of at least the higher melting component under the conditions existing in the mixture and thereafter separating them from the mother liquor. The crystals are then introduced into a purification column and are moved by mechanical means or by gravity and hydrostatic pressure toward the opposite end of the column which is heated so as to form a melting section in the column and melt the crystals entering this section. The crystals are moved in a compact continuous mass toward the melting section and are washed and purified by a portion of the melt which is displaced by the moving crystals inasmuch as less than the total melt is removed as product from the melting section of the column. In one modification of the process the crystal mass is slowly and continuously stirred so as to prevent agglomeration of the crystals in instances where the crystals are waxy and to avoid channeling of reflux liquid or melt as it flows toward the filters.

In processes of the type described one of the problems encountered is that of keeping the filters through which reflux and mother liquor are removed from the column free of crystals or in an unplugged condition so as to permit the required amount of filtrate to pass through the filter screens without too much pressure drop across the filters. Another problem encountered in crystal purification processes and apparatus is that of avoiding channeling of reflux as it passes through the crystal mass countercurrently to the flow of crystals. Of course the channeling of reflux to any substantial degree reduces the purity of the product recovered from the melting section of the column. Another problem is that of providing sufficient filter area in columns of commercial size without unduly extending the length of the column.

The invention is concerned with a solution to these problems. One object of the invention is to provide an improved process and apparatus for the separation and purification of a component of a multi-component mixture containing organic and/or inorganic components. Another object is to provide an improved process and apparatus for washing occluded impurities from relatively pure crystals. It is also an object of the invention to provide an improved method and apparatus for filtering a liquid from crystals in a crystal purification process and apparatus. A further object is to provide a process and apparatus for continuously unplugging a filter screen in a crystal purification column. An additional object is to provide an apparatus and process for reducing channeling of reflux and increasing the filter area of a crystal purification column without lengthening the column. Another object of the invention is to provide an improved process for concentrating dilute solutions containing a component which crystallizes first on reducing the temperature of the solution. Other objects will become apparent upon consideration of the accompanying disclosure.

The invention comprises cooling a liquid multi-component mixture containing a component which crystallizes first upon lowering the temperature of the mixture, passing the crystals in the form of a slurry, which may be of a wide range of solids content, into a crystal purification column and moving the same toward the other end of the column where a melting section is maintained. As the slurry progresses through the column, the liquor is filtered from the crystals and removed from the column at least partially through an axially disposed filter attached to an axial shaft with respect to the column. The axial shaft filter may be operated in a stationary position, but is preferably slowly rotated so as to cover the entire cross section of the purification column. While the radial filter arms of the invention advantageously extend from the shaft to close proximity to the wall of the column, arms of any length, or even a cylindrical filter mounted on the shaft and extending only a portion of the distance from the shaft to the wall of the column, are advantageous in filtering the liquor from the crystal purification column. The invention also provides a series of brushes in combination with a shaft filter in a purification column, which are positioned so as to brush crystals from the filter screens of the rotating arms as they pass over the brushes.

The axial shaft filter of the invention may be utilized in conjunction with a wall filter, or one or more of them may be utilized to effect all of the filtering required in a crystal purification process. In columns of large transverse cross section in which the filtering requirements are demanding, two or more sets of axial shaft filters may be utilized with or without the aid of a wall filter.

A more complete understanding of the invention may be had from a consideration of the accompanying drawing of which:

Figure 1:
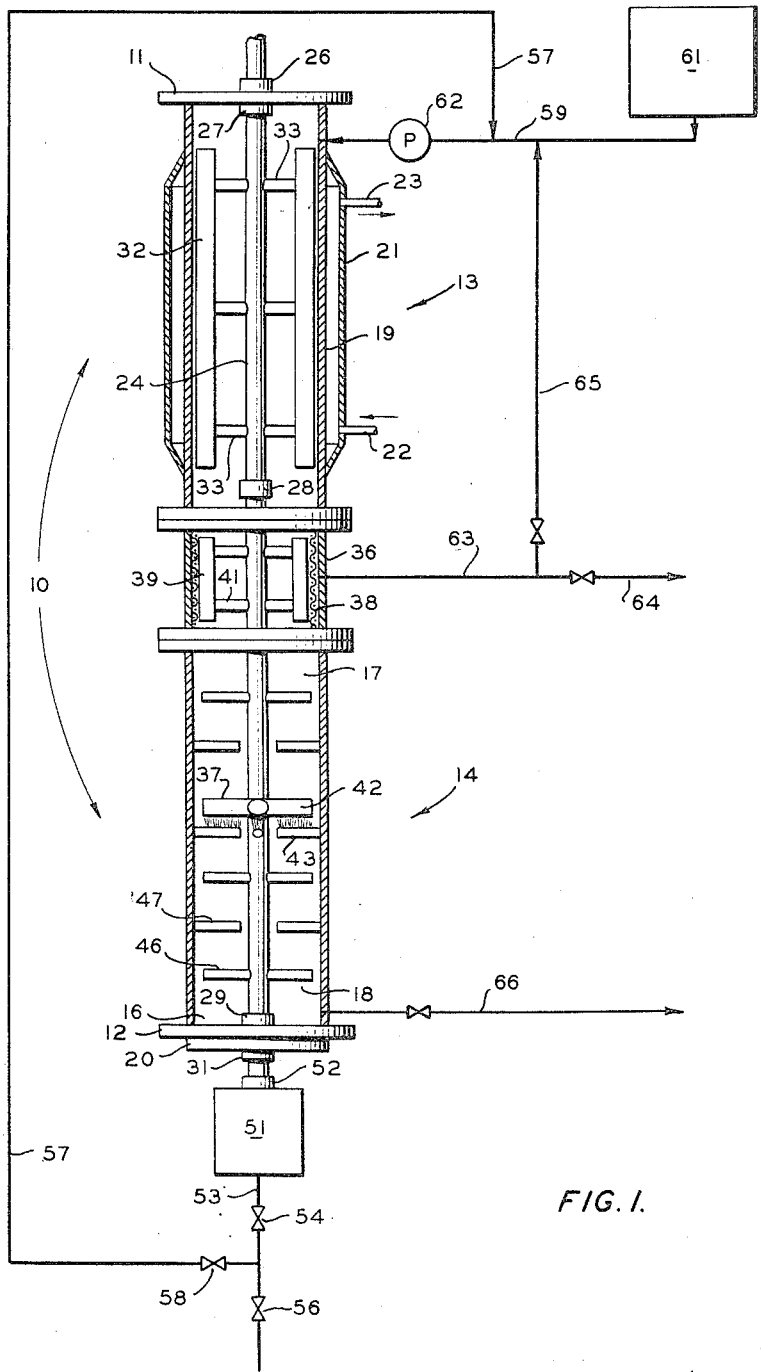
Figure 1 is an elevation partly in section of one modification of the invention.

Referring to Figure 1, numeral 10 denotes a crystal purification column having top and bottom closure members 11 and 12, respectively. The column includes crystallizer or chiller section 13 and a purification section 14 which includes a melting section 16, a filtering section 17 and a reflux section 18.

Crystallizer section 13 has an inner wall corresponding to the wall 19 of the column and a jacket 21 providing ample space for refrigerant which is introduced through line 22 and withdrawn through line 23. An axial shaft 24 extending through the column is supported by bearings 26, 27, 28, 29, and 31. Bearings 26 and 29 are fixed to and rotate with the shaft while bearings 27, 28, and 31 are fixed relative to the shaft. The crystallizer section includes a set of scraper blades 32 mounted on shaft 24 by means of radial rods 33. A heating element 20 supplies heat for the melting section.

In the modification of the invention shown in Figure 1, the filter section includes a wall filter 36 and a radial shaft filter 37. Wall filter 36 comprises a cylindrical screen 38 and a set of scraper blades 39 mounted on a shaft 24 by means of rods 41. The cylindrical wall section of filter 36 may advantageously be of larger diameter than that of the column above and below the filter, with the screen being of the same diameter as that of the column so as to avoid constriction of the column in the filter section.

Figures 2, 3, 4, 5, 6:
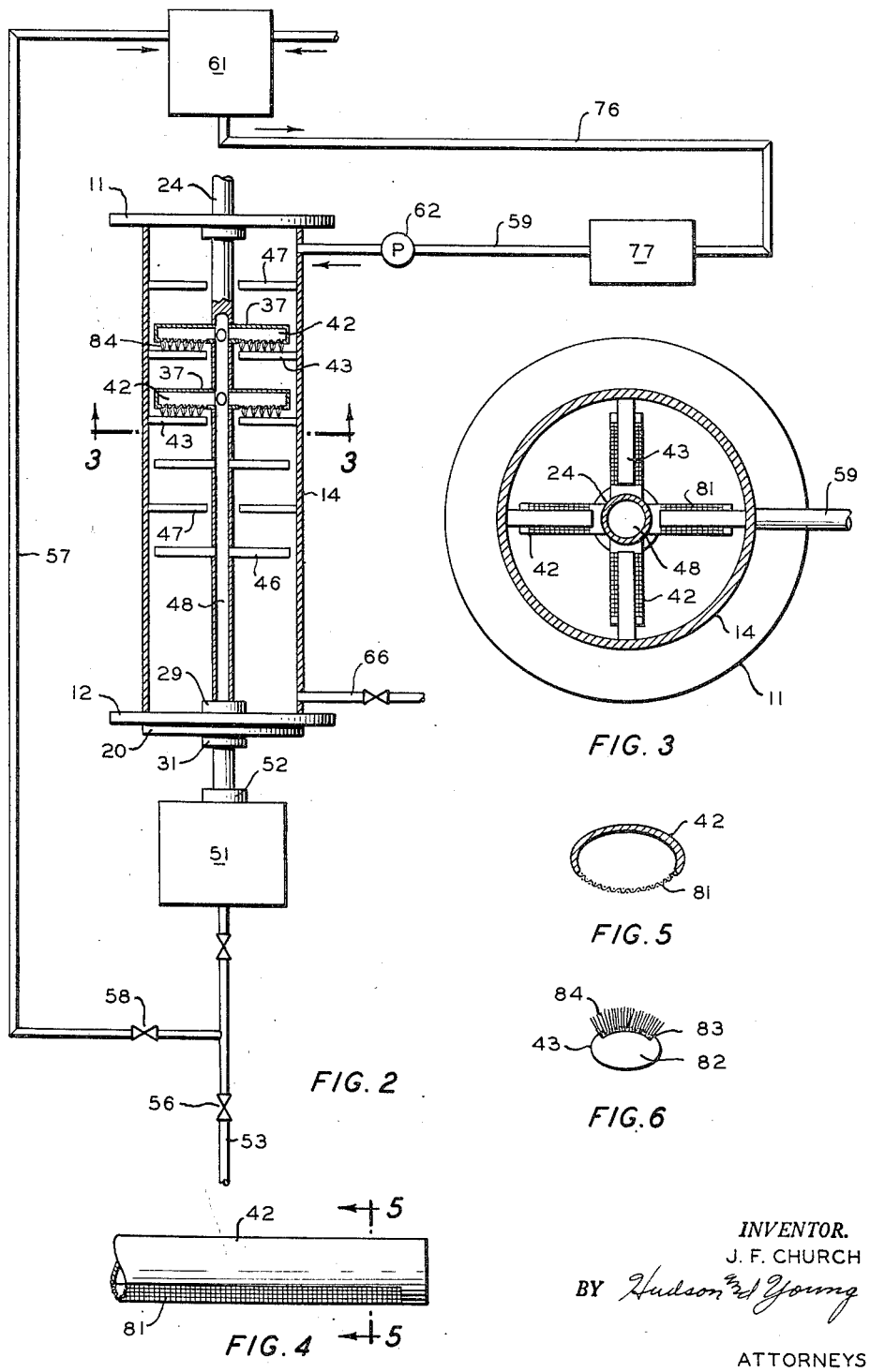
Figure 2 is an elevation partly in section of another modification of the invention.
Figure 3 is a cross section of the column of Figure 2 taken on the line 3—3.
Figure 4 is a side elevation of one type of radial filter arm.
Figure 5 is a transverse cross section of the filter arm of Figure 4 taken on the line 5—5.
Figure 6 is an end elevation of one of the brushes of the apparatus of Figures 1 and 2.

Axial shaft filter 37 comprises a set of radially extending filter arms 42 having a filter means in the lower side thereof as shown in Figures 4 and 5. The filter is provided with a plurality of brushes 43 disposed just below the level of the filter arms so that as the arms are rotated with the shaft the filter surfaces engage the brushes. This brushing action assists in removing crystals from the filter surfaces and tends to improve the rate of filtering. A series of radial stirring rods 46 are disposed on shaft 24 at spaced intervals along its length in the purification section of the column. A series of fixed radial rods 47 inwardly extending from the column wall are spaced alternately with respect to stirring rods 46 so as to assist in maintaining a uniform crystal mass in the purification column and avoid rotation of the entire crystal mass, which might occur with only stirring rods 46 and filter 37 on the shaft.

Filter arms 42 are hollow or tubular and the channel area connects with the hollow portion 48 of shaft 24 leading into a receiver 51 which is provided with a packing gland 52. Receiver 51 is provided with a take-off line 53 in which is positioned a motor valve 54 which is normally open and a take-off valve 56. A recycle line 57 controlled by valve 58 leads to feed line 59 entering the top of the column. A reservoir or supply tank 61 connects with feed line 59. A pump 62 forces the feed under pressure into column 10 at the upper end of the crystallizer or chiller section.

Line 63 conducts the filtrate or mother liquor from filter section 36 to a take-off line 64 and to a recycle line 65. A product take-off line 66 connects with melting section 16.

Filter 37 may be backwashed by closing valve 54 in line 53 and applying pressure in any suitable manner to the liquid in reservoir 51.

Referring to Figure 2, purification column 14 corresponds to section 14 of Figure 1. Axial shaft 24 contains hollow section 48 which connects with two sets of tubular radial filter arms 37. The corresponding elements or members of column 14 of Figure 2 are correspondingly numbered to those of Figure 1. Recycle line 57 connects with supply tank or reservoir 61 which contains the liquid mixture to be separated. Line 76 connects supply tank 61 with a crystallizer or freezer 77 which connects with feed line 59.

In the modification of the invention shown in Figure 2 the feed to be separated into a pure and relatively impure component is chilled in refrigerator 77 so as to separate the higher melting component in crystalline form. The resulting slurry is forced by pump 62 through line 59 into purification column 14. This is in contrast to the operation of column 10 of Figure 1 to which a liquid feed is fed through line 59 in which the crystallization or solidification of one of the feed components is effected in the upper part of the column. Filters 37 in column 14 may also be backwashed when necessary or desired.

Referring to Figure 3 the elements or members therein are numbered correspondingly to those in Figures 1 and 2. While a set of 4 hollow radial filter arms 42 is shown a greater or lesser number may be utilized in any set. However, it is preferred to use at least 2 filter arms in a set. This also applies to the number of brushes in any given set, but the number of brushes does not necessarily correspond to the number of filter tubes or arms in each set. In fact, in applications where backwashing of the filter is utilized, the brushes may be omitted from the apparatus and the filters may be kept unplugged entirely by backwashing.

Referring to Figure 4, hollow filter arm 42 is fabricated of a metal tube or other substantially inert material in the process to which the invention is applied. The section of the tube nearest the melting section of the column is perforated or otherwise provided with a filter section such as screen 81. In order to provide sufficient structural backing for the screen to impart rigidity and strength thereto, a portion of the tube wall may be left uncut or removed at spaced intervals along the length of the tube (not shown). There are other methods of providing structural backing for the screen which are obvious to those skilled in the art. It is also feasible to include a filter surface in the outside ends of the hollow filter arms where increased filter surface is desired.

Figure 5 is self-explanatory when read in connection with Figure 4. Tube 42 may be of circular cross section or it may be elliptical in cross section as shown in this figure. It is also feasible to extend screen 81 upwardly along the back edge of the arm as it rotates through the crystal mass.

The brush 43 of Figure 6 comprises a solid rod 82 having imbedded therein a plate 123 from which extend bristles 124. This brush assembly may be fabricated of any suitable materials in the process to which the invention is applied. The bristles may be made of a suitable fiber, such as nylon, or a metal wire or other materials. It is desirable to attach the bristles to a removable plate such as plate 83 so that the same may be replaced readily. Plate 83 may be fastened to rod 82 with screws (not shown).

In some processes it is not essential to utilize stirring rods 46 and fixed rods 47 of the purification column and these may be omitted without departing from scope of the invention. However, these elements are advantageous when operating in the purification of soft waxy type crystals which have a tendency to agglomerate and form an impervious mass.

In the operation of the apparatus of Figure 1, liquid feed mixture from source 61, which may be a liquid multicomponent mixture containing components of different melting points, is introduced through line 59 into scraped surface crystallizer or chiller 13 under pressure developed by feed pump 62. Refrigerant is passed into the jacket of the chiller through line 22 and withdrawn therefrom through line 23 at a temperature and rate sufficient to maintain a temperature within the chiller below the freezing temperature of the higher melting component. The feed mixture fills the entire length of elongated column 10 and a super-atmospheric pressure is maintained at the top of the column by means of pump 62. As shaft 24 is slowly rotated crystals of the frozen component are scraped off the wall 19 of the freezer section 13 and the resulting slurry is moved through the column toward the melting section. It is within the scope of the invention to utilize scraper blades in the form of a spiral ribbon which assist in moving the crystals through the column.

In passing filter 36, because of adequate pressure drop across the filter, mother liquor is filtered from the crystals and is withdrawn through line 63, any portion of which may be recycled through line 65 to feed line 59. The crystals and occluded impurities are forced through the purification section 14 toward melting section 16 and the end of the relatively compact mass of crystals is melted as it enters the melting section. Only a portion of the melt is withdrawn through line 66 and the remainder is displaced countercurrently through the column of crystals toward filter 37. This reflux of melt washes occluded impurities from the crystals and at least a portion of the melt is refrozen in the mass of crystals. A portion of the reflux together with impurities that are removed from the crystals and some mother liquor are withdrawn as filtrate through shaft filter 37 and the hollow section of the shaft to receiver 51. During that portion of the operation when the filters are not being backwashed to unplug the same, filtrate from receiver 51 passes through line 53 and valve 56 to any suitable use or disposal, or any portion of the filtrate may be recycled through valve 58 and line 57 to feed line 59. It is preferred to withdraw from the system through valve 56 most of the filtrate including the impurities removed from the crystals in the purification section in order to avoid increasing impurities in the system.

In the application of the apparatus of Figure 1 to the concentration of such liquids as fruit juice in which the process involves freezing out the water and washing occluded concentrated juice from the ice crystals, the filtrates removed through lines 53 and 63 will both be valuable products of the process in that the concentration of the fruit juice is relatively high in these streams as compared with its concentration in the feed stream in line 59. In this instance it will probably be undesirable to recycle the filtrates.

The operation of the apparatus of Figure 2 differs from that of Figure 1 principally in the physical condition of the feed to the column. In Figure 2, as pointed out hereinbefore, the feed passing through line 59 into the end of the column is in the form of a slurry in which the crystals may be highly concentrated or in which there is a relatively low concentration of crystals. In freezing most systems, even when most of the liquid is removed, the crystal mass contains at least about 20–25 percent liquid. A concentrated crystalline mixture of this nature may be fed directly into purification column 14 and may be forced through the column by means of a reciprocating piston or other pressure device such as that disclosed in above-identified application Serial No. 375,850. In instances where the crystalline material being purified is relatively hard and forms a rather dense porous mass, it may be found essential to omit stirring rods 46 and fixed rods 47 from the column and to operate the apparatus without rotating the filter or filters. In this instance practically the entire cross section of the column can be covered by the filters by arranging arms of the upper and lower filters in alternate spaces with respect to each pair of filter arms. In this manner the lower filter covers a different section of the transverse cross section of the column than the upper filter. The backwashing of the axial shaft filters in Figure 2 is effected in the same manner as described in connection with Figure 1.

While the purification columns shown are in upright position, it is feasible and within the scope of the invention to operate them in horizontal or oblique position, and even with the column in inverted position with the melting section at the top of the column. Not all of the pumps, compressors, etc., which may be needed in practicing the invention have been shown in the drawing, but their use is obvious to those skilled in the art and are not a part of the invention.

The apparatus and process of the invention are applicable to any of the separation processes described in the aforesaid applications. The axial shaft filter or filters disclosed herein provide more uniform filtering over a transverse cross section of a crystal purification column and also provide a means for greatly increasing the effective area of the filtering means in a column of this kind without lengthening the column. This is a worthwhile advantage in columns of substantial diameter of the order of six inches and upwards. Another advantage gained by the use of axial shaft filters which are rotated through the column is in the more uniform refluxing or washing of the crystals in the purification section of the column due to the substantially complete elimination of channeling.

While the invention has been described in connection with present preferred embodiments thereof, it is to be understood that this description is illustrative only and is not intended to limit the invention.

I claim:

1. Apparatus of the class described comprising a cylindrical vessel having an opening adjacent one end for withdrawing liquid and an opening in the opposite end for introducing discrete crystals to be purified; an axial shaft in said vessel having at least one set of hollow radial filter arms fixed thereto intermediate the ends of said vessel, said shaft being hollow at least from said filter to one end so as to provide a flow path for filtrate through said filter arms and shaft to a receiver outside of said vessel.

2. The apparatus of claim 1 in which said filter arms extend approximately to the wall of said vessel.

3. The apparatus of claim 1 including a plurality of radial stirring rods on said shaft spaced apart from said filter arms and along said shaft.

4. The apparatus of claim 3 including a plurality of fixed radial rods extending inwardly from the wall of said vessel intermediate said stirring rods.

5. The apparatus of claim 1 wherein said shaft is hollow from said filter arms to its end adjacent said one end of said vessel.

6. Apparatus of the class described comprising in combination a cylindrical vessel having means in one end for introducing discrete contaminated crystals of a material to be purified and means in the opposite end for withdrawing liquid purified material; an axial shaft extending through said vessel, being hollow from an intermediate section to one end thereof and having a filter means in the wall thereof intermediate the ends of said vessel, thereby providing a flow path for filtrate through said filter means and said shaft to the open end of said shaft; and means for heating said opposite end of said vessel.

7. The apparatus of claim 6 wherein said filter means comprises at least one set of tubular radial filter arms extending the major portion of the distance to the wall of said vessel, the arms of each set being in the same plane.

8. The apparatus of claim 7 including at least one brush for each set of filter arms, disposed on an axial rod attached to the wall of said vessel in such a position that the bristles contact the filter surface of said filter arms as they are rotated with said shaft.

9. The apparatus of claim 7 including a plurality of radial stirring rods on said shaft spaced apart from said filter arms and along said shaft and a plurality of fixed radial rods extending inwardly from the wall of said vessel and spaced alternately with respect to said stirring rods.

10. Apparatus of the class described comprising a cylindrical vessel having a melting section in one end, including heating means, and a purification section extending from said melting section toward the opposite end of said vessel; means for moving crystals through said vessel toward said melting section; an internal filter section in said purification section upstream crystalwise from said melting section; a tubular axial shaft extending from said filter section through said melting section through the end of said vessel adjacent said melting section, said tubular shaft being connected with said filter so as to provide a flow path for filtrate out of said vessel through said shaft; and a product outlet from said melting section.

11. The apparatus of claim 10 wherein said filter section comprises a hollow axial shaft extending through said melting and purification sections to a filtrate receiver adjacent the melting section of said vessel, said shaft having at least one set of tubular radial filter arms extending into said purification section.

12. The apparatus of claim 11 including a crystallizer section in communication with the upstream end crystalwise of said purification section and means for moving crystals from said crystallizer into said purification section.

13. The apparatus of claim 10 including a crystallizer section adjacent the upstream end crystalwise of said purification section, said axial shaft extending through aforesaid sections, at least one radial filter on that portion of the shaft in said purification section comprising a set of tubular radial filter tubes disposed in the same plane at substantially equal angles to each other; radial stirring rods on said shaft upstream and downstream of said filter; fixed radial rods inwardly extending from the wall of said vessel alternately to said stirring rods; a wall filter in the end of said purification section adjacent said crystallizer section having a take-off line; a set of scraper blades mounted on that portion of said shaft in said crystallizer section adapted to scrape crystals off the adjacent wall; and means for introducing a liquid feed to said crystallizer section and forcing a slurry of crystals into said purification section.

14. A continuous process for increasing the concentration of a crystalline material obtained by freezing the same from a multi-component liquid mixture, comprising passing a contiguous mass of crystals of said material containing occluded impurities through a purification zone toward a melting zone; melting crystals in said melting zone; withdrawing only a portion of the resulting melt so that a portion of the melt is forced to flow countercurrently through at least a portion of said mass of crystals as a reflux to purify same; withdrawing a filtrate including a portion of said melt from said purification zone through an axial filter zone therein covering a substantial portion of the cross section of the purification zone and withdrawing the filtrate along the axis of said purification zone to a receiver outside of said purification zone.

15. The process of claim 14 wherein said filter zone is rotated about the axis of said purification zone during the filtering step.

16. The process of claim 15 wherein said filter zone is rotated through substantially the entire transverse cross section of said purification zone.

17. The process of claim 14 wherein said mass of crystals is continuously stirred during its movement through said purification zone.

18. The process of claim 14 including feeding a slurry of said crystals and mother liquor into said purification zone; withdrawing a first filtrate consisting principally of mother liquor through a first filter zone axially disposed with respect to said purification zone; withdrawing a second filtrate containing reflux melt downstream crystalwise of said first filter through a rotating axial filter zone.

References Cited in the file of this patent

UNITED STATES PATENTS

| | | |
|---|---|---|
| 2,593,300 | Hachmuth | Apr. 15, 1952 |
| 2,617,273 | Findlay | Nov. 11, 1952 |
| 2,617,274 | Schmidt | Nov. 11, 1952 |
| 2,632,314 | Vance | Mar. 24, 1953 |